US008782646B2

(12) United States Patent
Anand et al.

(10) Patent No.: US 8,782,646 B2
(45) Date of Patent: *Jul. 15, 2014

(54) NON-UNIFORM MEMORY ACCESS (NUMA) ENHANCEMENTS FOR SHARED LOGICAL PARTITIONS

(71) Applicant: International Business Machines Corporation, Armonk, NY (US)

(72) Inventors: Vaijayanthimala K. Anand, Austin, TX (US); Mark R. Funk, Mantorville, MN (US); Steven R. Kunkel, Rochester, MN (US); Mysore S. Srinivas, Austin, TX (US); Randal C. Swanberg, Round Rock, TX (US); Ronald D. Young, Zumbrota, MN (US)

(73) Assignee: International Business Machnies Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/682,966

(22) Filed: Nov. 21, 2012

(65) Prior Publication Data

US 2013/0080712 A1    Mar. 28, 2013

Related U.S. Application Data

(63) Continuation of application No. 12/394,669, filed on Feb. 27, 2009, now Pat. No. 8,490,094.

(51) Int. Cl.
*G06F 9/50* (2006.01)
*G06F 13/00* (2006.01)

(52) U.S. Cl.
CPC ...... *G06F 9/5077* (2013.01); *G06F 2212/2542* (2013.01)
USPC .......... 718/100; 718/102; 718/103; 718/104; 711/147; 711/148; 711/149; 711/150; 711/151; 711/152; 711/153; 711/117

(58) Field of Classification Search
None
See application file for complete search history.

(56) References Cited

U.S. PATENT DOCUMENTS

| 2004/0194098 A1 | 9/2004 | Chung et al. |
| 2007/0168635 A1 | 7/2007 | Allen et al. |
| 2008/0163203 A1 | 7/2008 | Anand et al. |
| 2009/0307439 A1 | 12/2009 | Jacobs et al. |

FOREIGN PATENT DOCUMENTS

EP    1674987 A2    6/2006

OTHER PUBLICATIONS

C. Hales et al., "PowerVM Virtualization on IBM System p: Introduction and Configuration, Fourth Edition," May 2008, pp. i-66, XP002586584, Redbooks, http://www.redbooks.ibm.com/redbooks/pdfs/sg248000.pdf.

(Continued)

*Primary Examiner* — Qing Wu
(74) *Attorney, Agent, or Firm* — Martin & Associates, LLC; Derek P. Martin

(57) ABSTRACT

In a NUMA-topology computer system that includes multiple nodes and multiple logical partitions, some of which may be dedicated and others of which are shared, NUMA optimizations are enabled in shared logical partitions. This is done by specifying a home node parameter in each virtual processor assigned to a logical partition. When a task is created by an operating system in a shared logical partition, a home node is assigned to the task, and the operating system attempts to assign the task to a virtual processor that has a home node that matches the home node for the task. The partition manager then attempts to assign virtual processors to their corresponding home nodes. If this can be done, NUMA optimizations may be performed without the risk of reducing the performance of the shared logical partition.

12 Claims, 12 Drawing Sheets

(56) References Cited

OTHER PUBLICATIONS

IPCOM000133807D, "System and Method to Optimize Cache and Memory Affinity in a Virtualized Environment," http://priorartdatabase.com/IPCOM/000133807.

IPCOM 000133807D, "System and Method to Optimize Cache and Memory Affinity in a Virtualized Environment," http://priorartdatabase.com/IPCOM/000133807.

"Manual NUMA Optimizations," http://www.vmware.com/support/esx2/doc/esx20admin_res-NUMA-options.html.

Mark Funk, "Enhanced eServer iSeries Performance Memory Affinity," http://www-03.ibm.com/systems/resources/systems_i_advantages_perfmgmt_pdf_memaffin.pdf.

NON-UNIFORM MEMORY ACCESS (NUMA) ENHANCEMENTS FOR SHARED LOGICAL PARTITIONS

BACKGROUND

1. Technical Field

This disclosure generally relates to computer systems, and more specifically relates to computer systems that include multiple logical partitions that share resources.

2. Background Art

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The Power Systems computer system developed by IBM is an example of a computer system that supports logical partitioning. If logical partitioning on a Power Systems computer system is desired, partition manager code (referred to as a "hypervisor" in IBM terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

Non-uniform memory access (NUMA) is a computer architecture that provides multiple nodes that each have multiple processors coupled to local memory. While all memory in all nodes may be accessed by any processor in the system, the time to access memory that is local to a processor is much less that the time to access memory that is remote from a processor (e.g., on a different node). In this sense, the memory access times in the system are non-uniform, meaning local memory accesses are faster than remote memory accesses.

Logical partitions may be dedicated or shared. A dedicated logical partition has resources that are dedicated to it, which means only the dedicated logical partition may use these resources. A shared logical partition, on the other hand, uses resources that may also be used by other logical partitions. When a computer has a NUMA topology and is logically partitioned, NUMA optimizations may be enabled on all dedicated logical partitions. However, NUMA optimizations are typically disabled for all shared logical partitions because the sharing of the resources reduces the effectiveness of the NUMA optimizations. In addition, if NUMA optimizations were enabled on shared logical partitions, it could lead to a net decrease in performance for the logical partition. As a result, when a NUMA computer system is logically partitioned in the prior art, NUMA optimizations are enabled for dedicated logical partitions but are disabled for shared logical partitions. Without a way to enable NUMA optimizations on shared logical partitions without the possibility of decreased performance, shared logical partitions in a NUMA computer system will not benefit from NUMA optimizations.

BRIEF SUMMARY

In a NUMA-topology computer system that includes multiple nodes and multiple logical partitions, some of which may be dedicated and others of which are shared, NUMA optimizations are enabled in shared logical partitions. This is done by specifying a home node parameter in each virtual processor assigned to a logical partition. When a task is created by an operating system in a shared logical partition, a home node is assigned to the task, and the operating system attempts to assign the task to a virtual processor that has a home node that matches the home node for the task. The partition manager then attempts to assign virtual processors to their corresponding home nodes. If this can be done, NUMA optimizations may be performed in shared logical partitions as well as dedicated logical partitions.

The foregoing and other features and advantages will be apparent from the following more particular description, as illustrated in the accompanying drawings.

BRIEF DESCRIPTION OF THE SEVERAL VIEWS OF THE DRAWING(S

The disclosure will be described in conjunction with the appended drawings, where like designations denote like elements, and:

Figure 16:
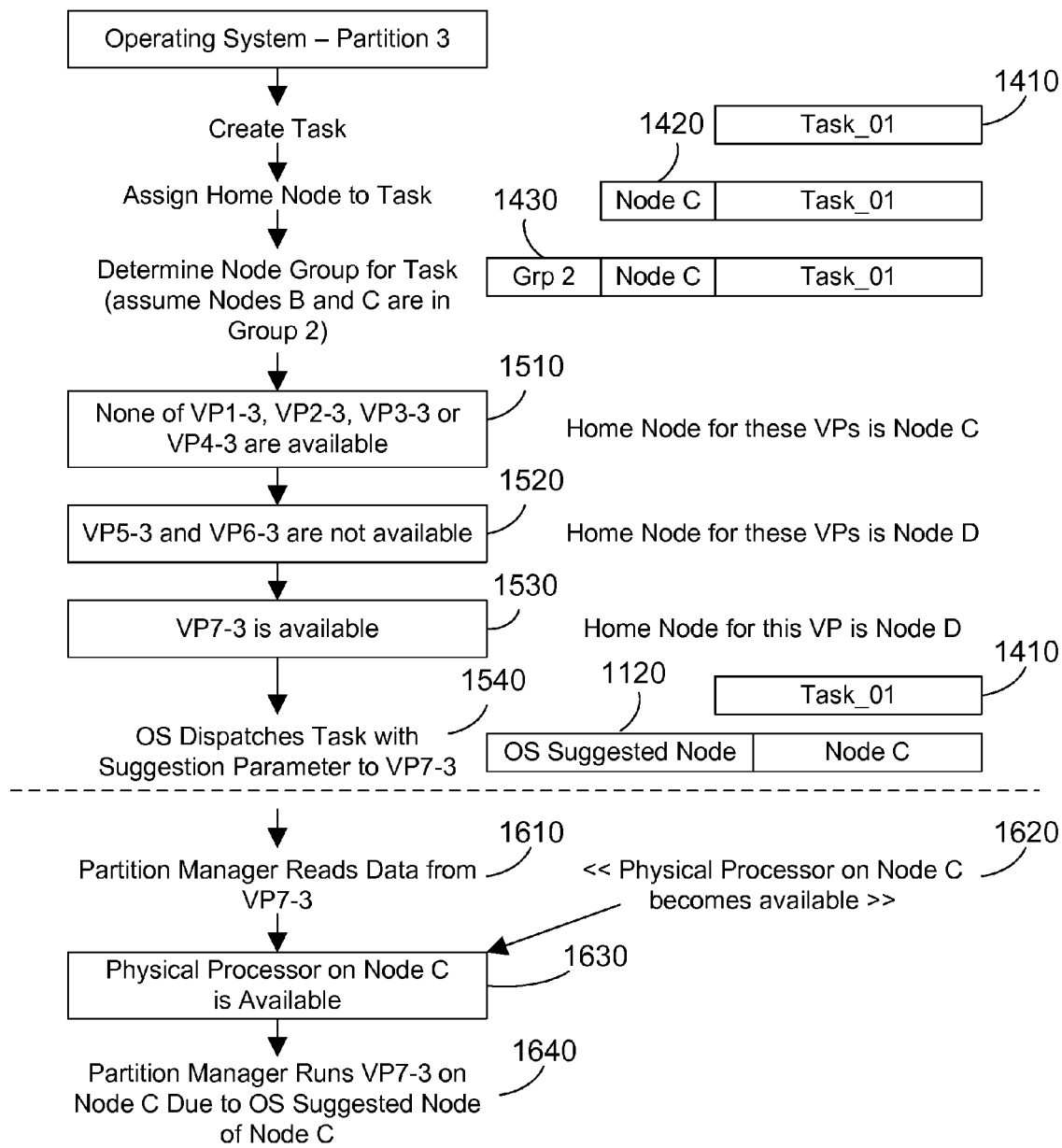
Figure 17:
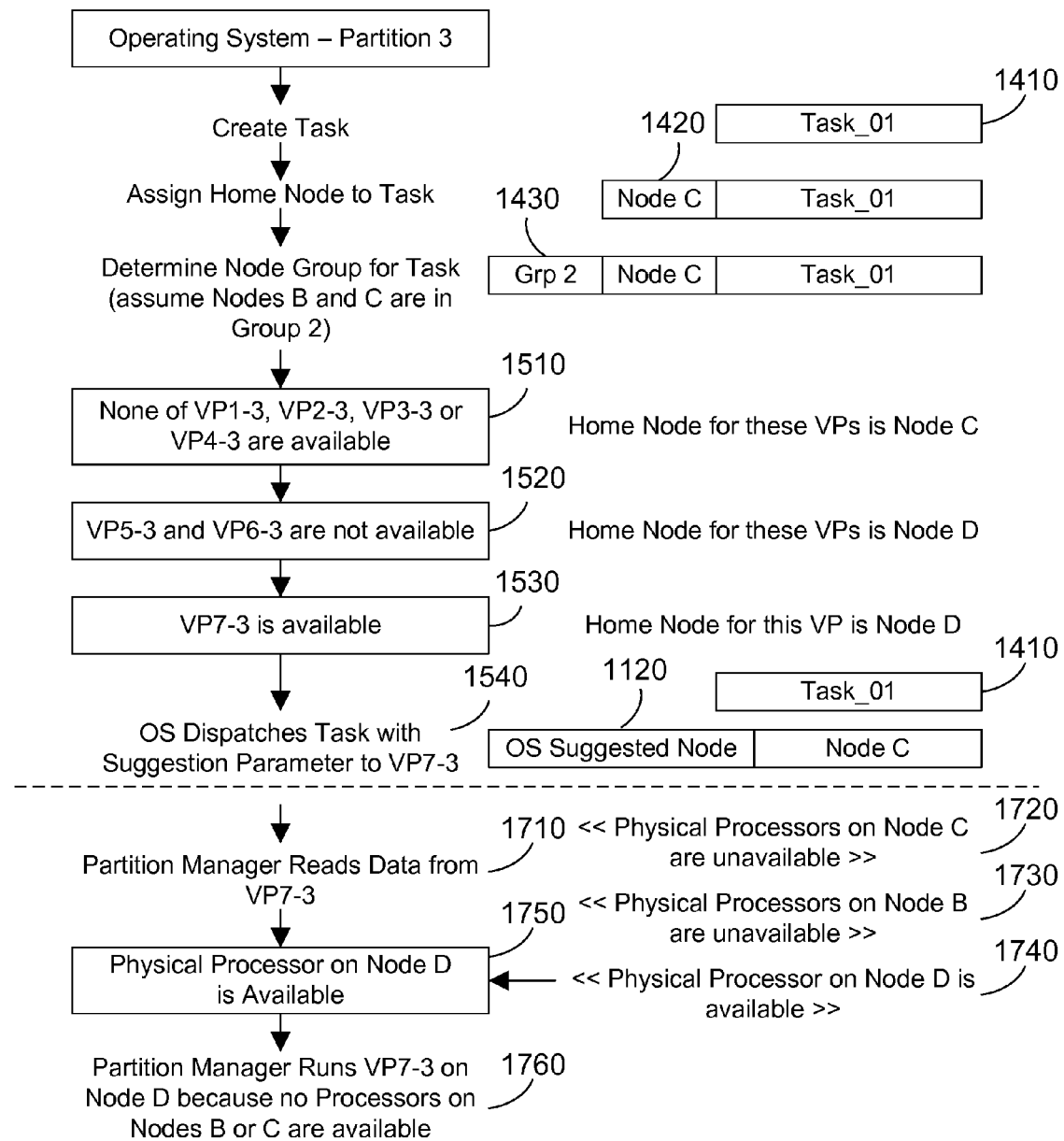

FIG. 16 is a diagram showing a third specific example that illustrates steps in an operating system in a shared logical partition dispatching a task to a virtual processor, followed by the partition manager assigning the virtual processor to a processor on a node; and FIG. 17 is a diagram showing a fourth specific example that illustrates steps in an operating system in a shared logical partition dispatching a task to a virtual processor, followed by the partition manager assigning the virtual processor to a processor on a node.

DETAILED DESCRIPTION

The disclosure and claims herein relate to a computer system with a NUMA topology that is logically partitioned into multiple logical partitions that share resources, and how NUMA optimizations may be accomplished in these shared logical partitions.

Figure 1:
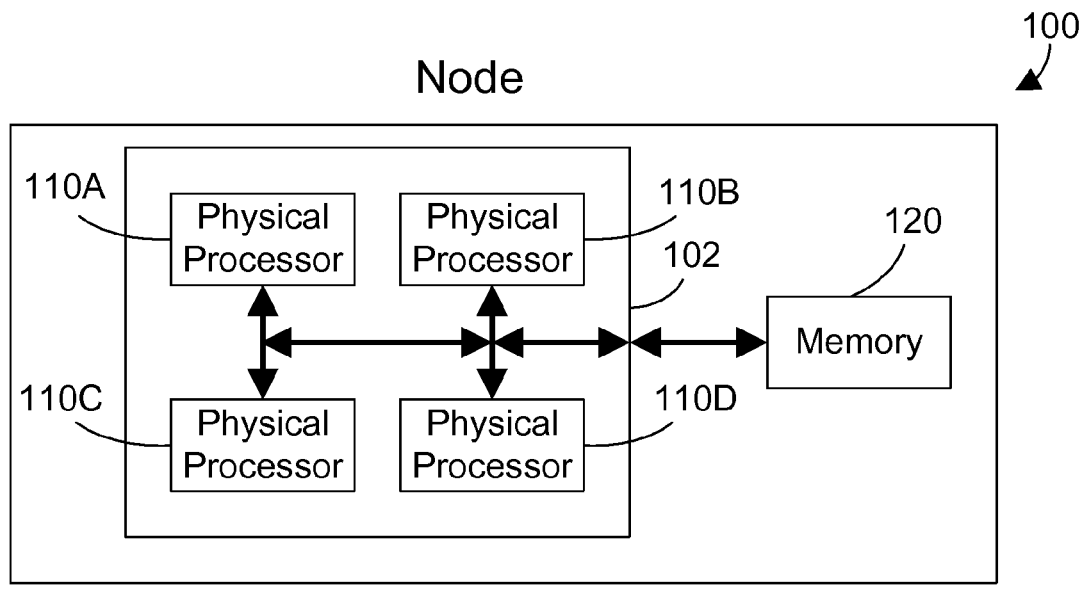
FIG. 1 is a block diagram of one specific prior art implementation for a node that may be used in a NUMA-topology computer system.

FIG. 1 shows a sample prior art node 100 in a NUMA-topology computer system. The specific node 100 in FIG. 1 includes a processor chip 102 with four physical processors, shown in FIG. 1 as 110A, 110B, 110C and 110D. The physical processors on chip 102 each typically include on-board cache memory, and are all interconnected via a common bus. This bus is also connected to a memory 120 external to the processor chip 102. Each physical processor may access the memory 120 with the same latency. In NUMA terminology, the memory 120 is termed "local" to the physical processors on chip 102, while memory that is local to processors on other nodes is "remote" to the physical processors on chip 102.

Figure 2:
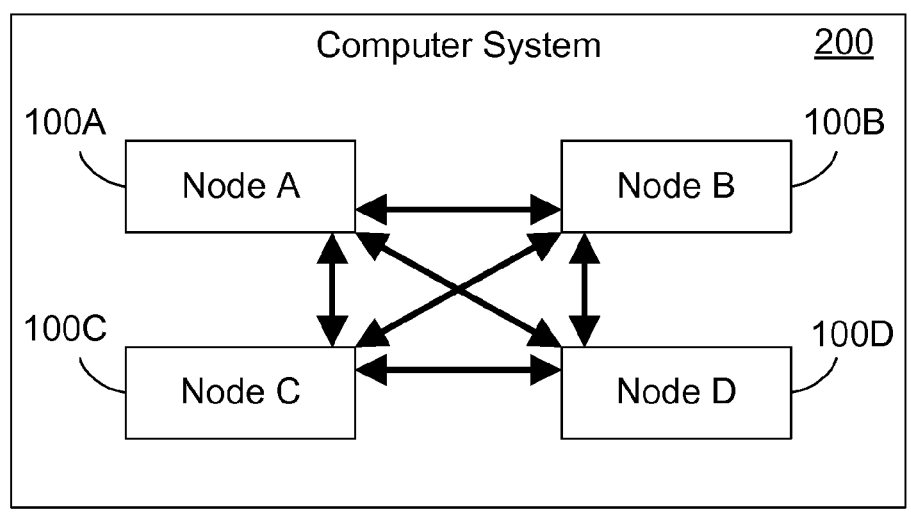
FIG. 2 is a block diagram of a sample prior art computer system that includes four of the nodes shown in FIG. 1.

A sample prior art computer system 200 is shown in FIG. 2 to include four nodes shown in FIG. 1, which are labeled in FIG. 2 as 100A, 100B, 100C and 100D. These nodes are interconnected with various busses that allow any processor in any node to access any memory on any node. Because the physical processors can access their local memory (within the same node) much more quickly than accessing remote memory (on a different node), the time required to access different memories in such a system is non-uniform, giving rise to the term Non-Uniform Memory Access (NUMA).

Figure 3:
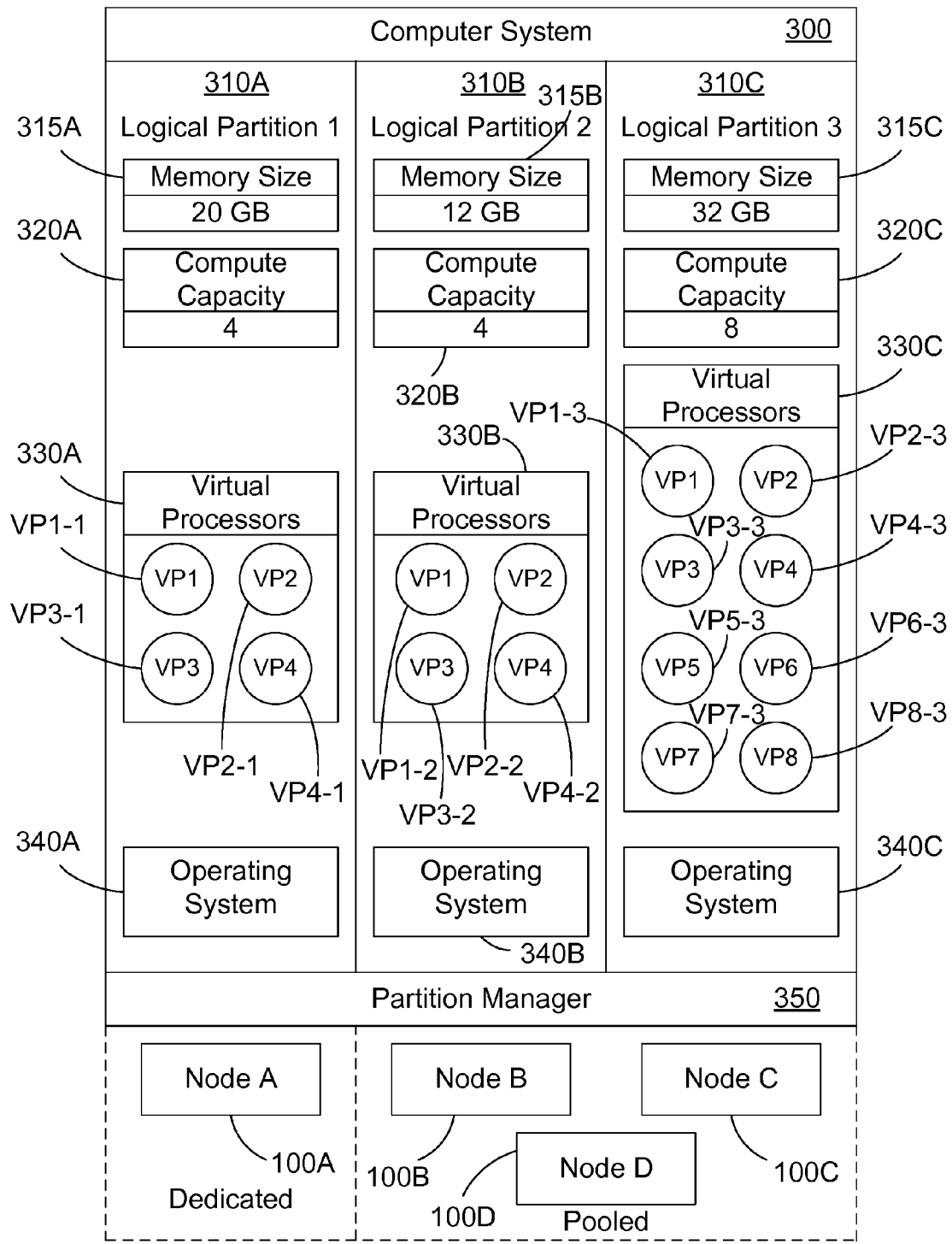
FIG. 3 is a block diagram of a computer system similar to the computer system in FIG. 2 that is logically partitioned, but with operating systems that allow NUMA optimizations in shared logical partitions.

FIG. 3 shows a computer system 300 similar to the prior art computer system 200 in FIG. 2 that has been logically partitioned. Note the individual nodes are shown at the bottom of FIG. 3, and represent physical hardware that is allocated to the logical partitions. Computer system 300 is logically partitioned into three separate logical partitions, shown in FIG. 3 as logical partitions 310A, 310B and 310C. Each logical partition specifies a memory size that represents a desired amount of memory for each logical partition that is allocated by partition manager 350 from the nodes. Each logical partition also specifies a computer capacity which corresponds to a number of physical processors that are allocated to the logical partition. Note the compute capacity may be specified in any suitable fraction of a processor, and need not be specified in whole numbers. For the specific example in FIG. 3, logical partition 310A includes a memory size 315A of 20 GB and a compute capacity of 4 processors 320A; logical partition 310B includes a memory size 315B of 12 GB and a compute capacity of 4 processors 320B; and logical partition 310C includes a memory size 315C of 32 GB and a compute capacity of 8 processors 320C. The allocation of memory size and compute capacity could vary from the specific example shown in FIG. 3.

Each logical partition also includes virtual processors. Because the computer system 300 is logically partitioned, the operating systems 340A, 340B and 340C do not dispatch a task to a physical processor. Instead, the operating systems dispatch tasks to virtual processors. After a task is dispatched to a virtual processor, the partition manager 350 finds a suitable physical processor to run the virtual processor. This allows the operating system to function the same way it does when operating in a stand-alone computer system, dispatching tasks to virtual processors in a logical partition in the same way it dispatches tasks to physical processors in a stand-alone computer system. For the specific example in FIG. 3, logical partition 310A includes four virtual processors, shown as VP1-1, VP2-1, VP3-1 and VP4-1. In similar fashion, logical partition 310B includes four virtual processors, namely VP1-2, VP2-2, VP3-2 and VP4-2. Logical partition 310C includes eight virtual processors, namely VP1-3, VP2-3, VP3-3, VP4-3, VP5-3, VP6-3, VP7-3 and VP8-3. Operating system 340A dispatches tasks to one of the virtual processors VP1-1, VP2-1, VP3-1 and VP4-1 in logical partition 310A. Operating system 340B dispatches tasks to one of the virtual processors VP1-2, VP2-2, VP3-2 and VP4-2 in logical partition 310B. Operating system 340C dispatches tasks to one of the virtual processors VP1-3, VP2-3, VP3-3, VP4-3, VP5-3, VP6-3, VP7-3 and VP8-3 in logical partition 310C. As explained above, once an operating system dispatches a task to a virtual processor, the partition manager 350 then finds a suitable physical processor to run the virtual processor. In the specific example in FIG. 3, the number of virtual processors is equal to the computer capacity for each logical partition. Note, however, this need not be the case. In fact, the number of virtual processors could far exceed the compute capacity for a given logical partition.

In the specific configuration shown in FIG. 3, the first logical partition 310A is a dedicated logical partition, which means a single node 100A with four processors is dedicated to executed the four virtual processors VP1-1, VP2-1, VP3-1 and VP4-1 in the logical partition. Because logical partition 310A is a dedicated partition, each of the virtual processors may be assigned to a corresponding physical processor in node A 100A. The fact that logical partition 310A is a dedicated logical partition allows NUMA optimizations to be performed for logical partition 310A according to known methods.

The second logical partition 310B and the third logical partition 310C are shown as shared logical partitions, which means they share a pool of resources shown at the bottom of FIG. 3 to include Node B 100B, Node C 100C and Node D 100D. This means the partition manager 350 may run any of the four virtual processors VP1-2, VP2-2, VP3-2 and VP4-2 in logical partition 310B on any physical processor in any of the three pooled nodes 100B, 100C and 100D. In similar fashion, the partition manager 350 may run any of the eight virtual processors VP1-3, VP2-3, VP3-3, VP4-3, VP5-3, VP6-3, VP7-3 and VP8-3 in logical partition 310C on any physical processor in any of the three pooled nodes 100B, 100C and 100D.

Computer system 300 may include other features of computer systems that are not shown in FIG. 3 but are well-known in the art. For example, computer system 300 may include a display interface, a network interface, and a mass storage interface to an external direct access storage device (DASD). The display interface is used to directly connect one or more displays to computer system 300. These displays, which may be non-intelligent (i.e., dumb) terminals or fully programmable workstations, are used to provide system administrators and users the ability to communicate with computer system 300. Note, however, that while a display interface is provided to support communication with one or more displays, computer system 300 does not necessarily require a display, because all needed interaction with users and other processes may occur via the network interface.

The network interface is used to connect the computer system 300 to multiple other computer systems via a network. The network interface and network broadly represent any suitable way to interconnect electronic devices, regardless of whether the network comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device, to computer system 300. One specific type of direct access storage device is a readable and writable CD-RW drive, which may store data to and read data from a CD-RW.

At this point, note that while the description above is in the context of a fully functional computer system, those skilled in the art will appreciate that the operating system and partition manager disclosed herein may be distributed as an article of manufacture in a variety of forms, and the claims extend to all suitable types of computer-readable media used to actually carry out the distribution, including recordable media such as floppy disks and CD-RW.

Figure 4:
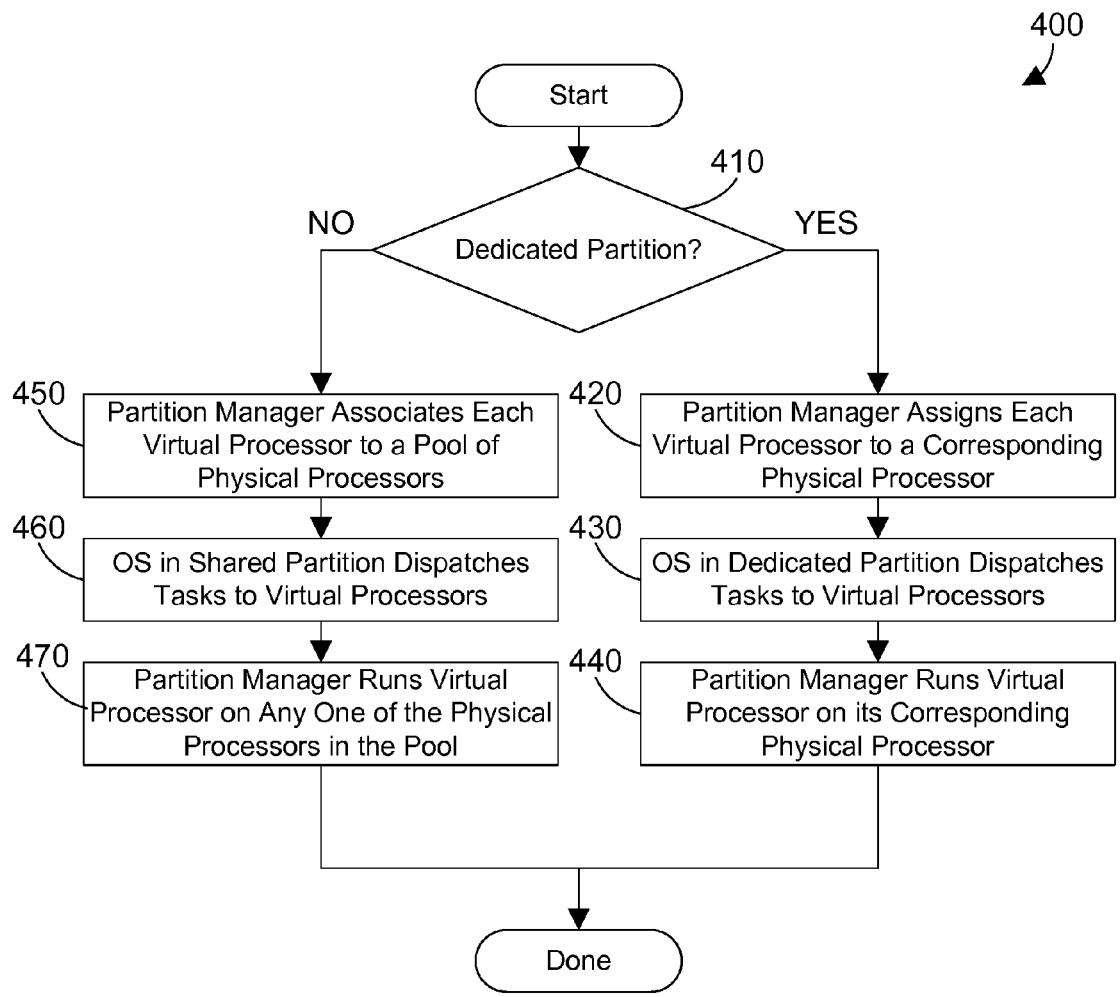
FIG. 4 is a flow diagram of a prior art method for a partition manager to run virtual processors in a logically partitioned computer system.

In the prior art, dedicated logical partitions and shared logical partitions are treated differently in a NUMA environment. Referring to FIG. 4, a prior art method 400 determines if a partition is dedicated (step 410). If so (step 410=YES), the partition manager assigns each virtual processor to a corresponding physical processor (step 420). The operating system in the dedicated partition then dispatches tasks to the virtual processors (step 430). In response, the partition manager runs each virtual processor on its corresponding physical processor (step 440). If the partition is a shared logical partition (step 410=NO), the partition manager associates each virtual processor to a pool of physical processors (step 450). Thus, for the computer system 300 shown in FIG. 3, each virtual processor in both logical partitions 310B and 310C are associated with the pool of processors in nodes 100B, 100C and 100D. The operating system in the shared partition dispatches tasks to the virtual processors (step 460). In response, the partition manager runs the virtual processor on any one of the physical processors in the pool (step 470).

Figure 5:
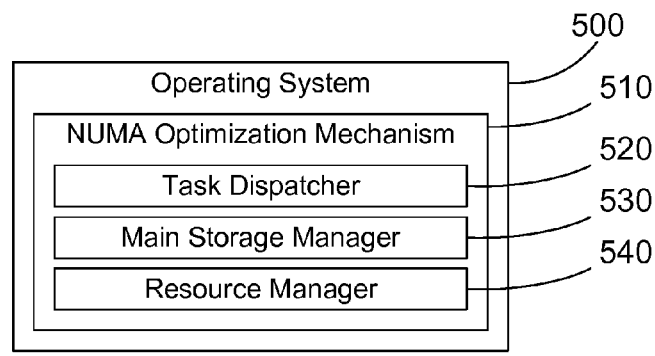
FIG. 5 is a block diagram of a prior art operating system that includes a NUMA optimization mechanism.

A prior art operating system used in a NUMA environment is shown in FIG. 5. Operating system 500 includes a NUMA optimization mechanism 510 that changes the function of the task dispatcher 520, main storage manager 530 and resource manager 540 to allow NUMA optimization in stand-alone computer systems and in dedicated logical partitions. The task dispatcher 520, main storage manager 530 and resource manager 540 also include other known functions that have nothing to do with NUMA optimizations, and which are not shown in FIG. 5. Part of prior art NUMA optimization mechanism 510 deals with allocating memory to tasks in a location where the task is most likely to execute, which is not discussed in detail herein.

Figure 6:
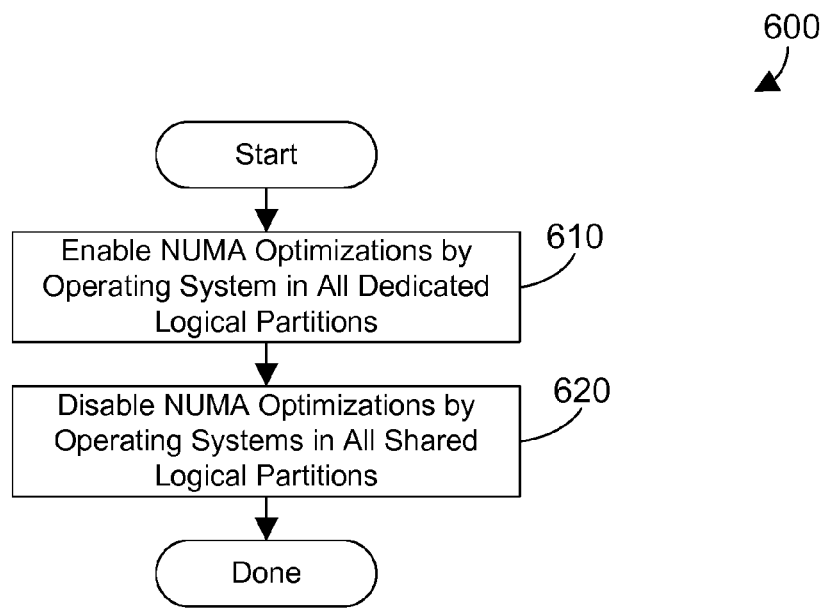
FIG. 6 is a flow diagram of a prior art method for enabling NUMA optimizations for dedicated logical partitions while disabling NUMA optimizations for shared logical partitions.

The NUMA optimization mechanism 510 typically does not perform NUMA optimizations in shared logical partitions. This is shown in prior art method 600 shown in FIG. 6. NUMA optimizations are enabled in the operating systems in all dedicated logical partitions (step 610). NUMA optimizations are disabled in the operating systems in all shared logical partitions (step 620). Note the enabling in step 610 and disabling in step 620 may be done in any suitable way. For example, if there is a flag in the operating system that enables NUMA optimizations, the flag would be set for the dedicated logical partitions in step 610 and would not be set for the shared logical partitions in step 620.

Figure 7:
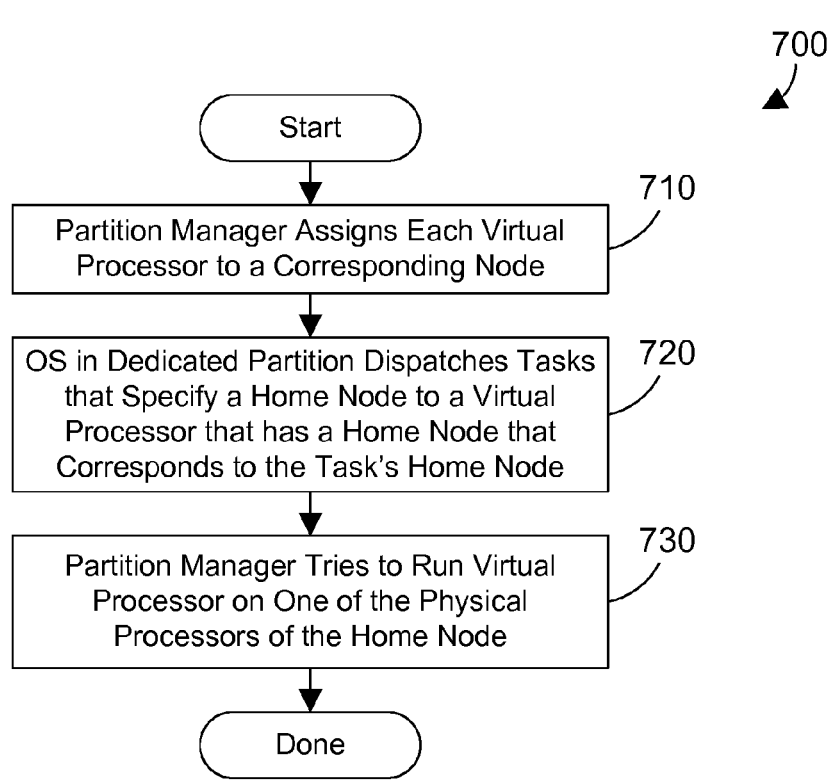
FIG. 7 is a flow diagram of a prior art method for a partition manager to run virtual processors in a way that allows NUMA optimizations for dedicated logical partitions.

Some NUMA optimizations have been performed in dedicated logical partitions, as shown by prior art method 700 in FIG. 7. First, the partition manager assigns each virtual processor to a corresponding node (step 710). This differs from step 420 in FIG. 4 because the virtual processor is assigned to a node that contains multiple processors, and is not assigned to a specific physical processor. The operating system then specifies a home node for a task when the task is created, and dispatches that task with the specification of the home node to a virtual processor that has a home node that corresponds to the task's home node (step 720). The partition manager then tries to run the virtual processor on one of the physical processor in the home node (step 730). Method 700 recognizes that memory access time for all processors on a node to the local memory is equal, so the partition manager need not assign a virtual processor to a specific physical processor, but may assign a virtual processor to a node, allowing the virtual processor to run on any of the physical processors on that node. Note, however, method 700 only applies to dedicated logical partitions. In fact, steps 710, 720 and 730 could replace steps 420, 430 and 440 in FIG. 4, which changes the steps for the dedicated partition (when step 410=YES), but does not change the steps for shared logical partitions (when step 410=NO).

Figure 8:
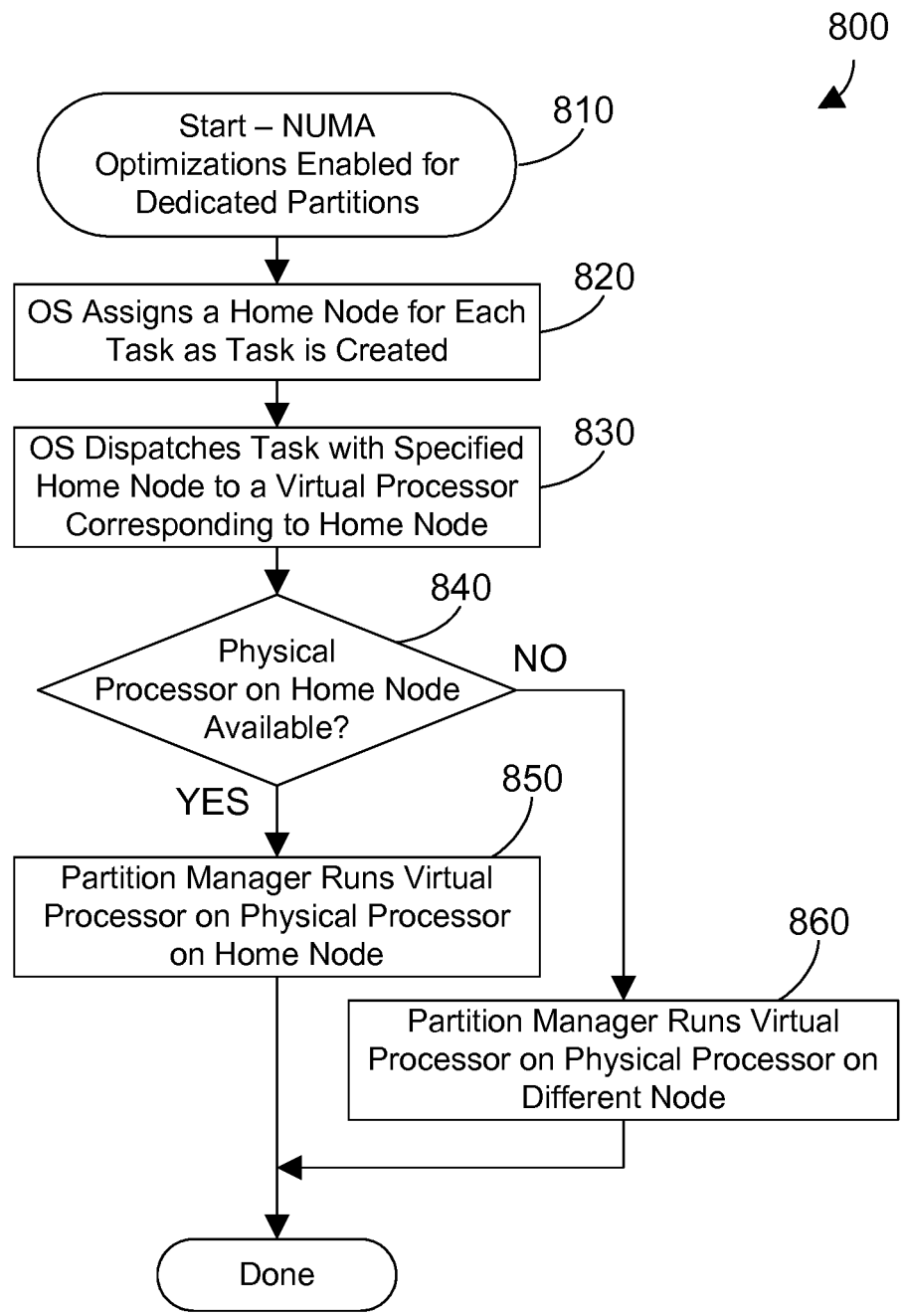
FIG. 8 is a flow diagram of a prior art method for allowing NUMA optimizations in dedicated logical partitions.

Referring to FIG. 8, a prior art method 800 is performed when NUMA optimizations are enabled for dedicated partitions (step 810). The operating system in the dedicated partition assigns a "home node" for each task as the task is created (step 820). The operating system then looks for a virtual processor that matches the home node parameter in the task, and dispatches the task with the specified home node to a virtual processor that corresponds to the home node (step 830). If a physical processor on the home node is available (step 840=YES), the partition manager runs the virtual processor on a physical processor on the home node (step 850). If a physical processor on the home node is not available (step 840=NO), the partition manager runs the virtual processor on a physical processor on a different node (step 860). Note there are memory allocation issues that would also be performed to accomplish NUMA optimizations that are not shown in FIG. 8 or discussed in detail herein.

A simple example will illustrate. Let's assume a dedicated partition had two nodes X and Y, each with four processors as shown in FIG. 1. Let's assume the operating system assigns X as the home node for a new task (step 820), then dispatches the task to a virtual processor corresponding to node X (step 830). If the partition manager determines a physical processor on node X is available (step 840=YES), the partition manager runs the virtual processor on a physical processor on node X (step 850). If, however, the partition manager determines there is no physical processor on node X available (step 840=NO), the partition manager may still run the virtual processor on a physical processor on node Y (step 860). Because the partition manager will try to run a virtual processor on its corresponding home node, method 800 supports NUMA optimizations in dedicated logical partitions.

Figure 9:
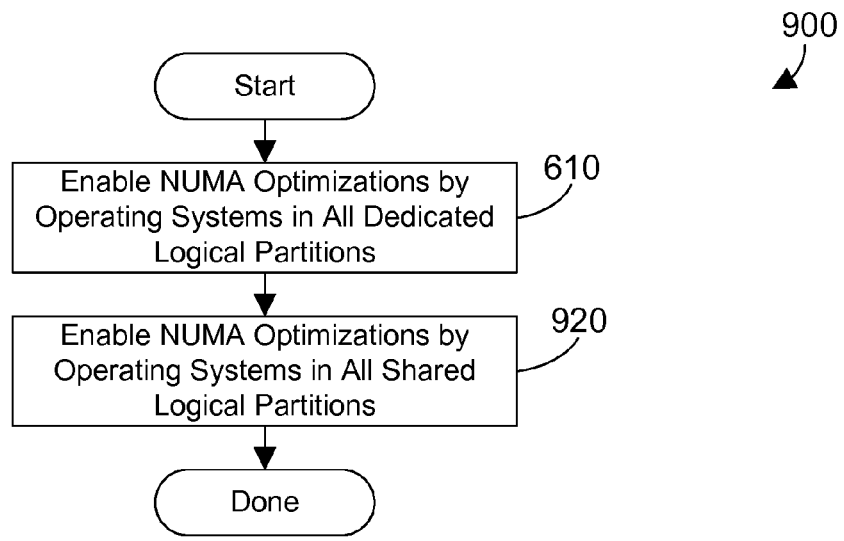
FIG. 9 is a flow diagram of a method for enabling NUMA optimizations for both dedicated and shared logical partitions.

In the prior art, NUMA optimizations may be performed in dedicated logical partitions but are not performed in shared logical partitions. The disclosure and claims herein overcome this limitation by allowing NUMA optimizations to be performed in shared logical partitions. Referring to FIG. 9, a method begins by enabling NUMA optimizations by operating systems in all dedicated logical partitions (step 610). Note this step is preferably the same as step 610 in prior art method 600 in FIG. 6. Next, NUMA optimizations are enabled by operating systems in all shared logical partitions (step 920). By enabling NUMA optimizations in shared logical partitions, method 900 provides enhanced performance when compared to method 600 in FIG. 6 that disables NUMA optimizations in shared logical partitions.

Figure 10:
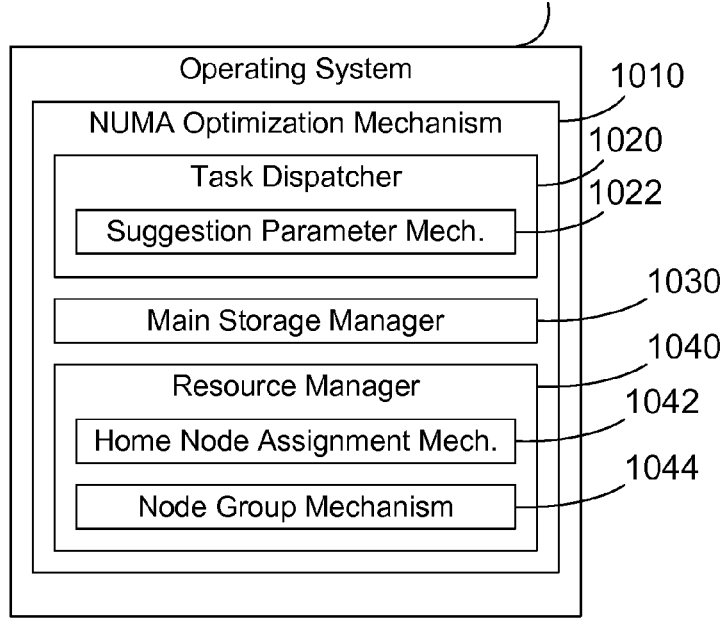
FIG. 10 is a block diagram of an operating system for logical partitions that allows NUMA optimizations in both dedicated and shared logical partitions.

Referring to FIG. 10, an operating system 340 is representative of the operating systems 340A, 340B and 340C shown in FIG. 3. Operating system 340 includes a NUMA optimization mechanism 1010 that allows NUMA optimizations to be performed in shared logical partitions. A task dispatcher 1020 includes a suggestion parameter mechanism 1022 that can specify a suggested node for a virtual processor even when the virtual processor has a home node that is different than the suggested node. The main storage manager 1030 allocates memory to a task in a way that attempts to allocate memory local to a processor where a virtual processor for the task is likely to execute. The resource manager 1040 includes a home node assignment mechanism 1042 that assigns a home node to each task as the task is created. Resource manager 1040 attempts to achieve a balance between the workloads of different virtual processors, and therefore determines when a task is created which home node to assign to the task depending on current conditions when the task is created. The resource manager 1040 may also optionally include a node group mechanism 1044 that allows grouping nodes into node groups. Note the various mechanisms shown in FIG. 10 are one suitable implementation in accordance with the disclosure and claims herein. However, the suggestion parameter mechanism 1022, home node assignment mechanism 1042 and node group mechanism 1044 could be implemented in any suitable form or location within operating system 340. In addition, these could also be implemented in code external to the operating system 340 that is accessed by the operating system 340.

Figure 11:
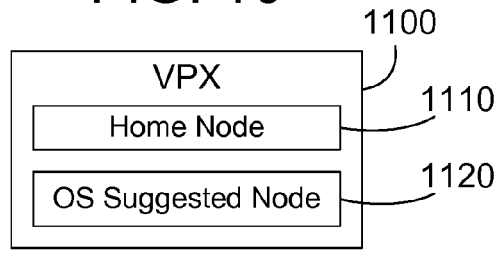
FIG. 11 is a block diagram showing parameters in a virtual processor that allow NUMA optimizations in shared logical partitions.

Each virtual processor includes two parameters, as shown in virtual processor X 1100 shown in FIG. 11. The first is a home node parameter 1110 that is assigned by the partition manager to relate a virtual processor to a particular node in the hardware. The second is an operating system suggested node parameter 1120 that is written to by the operating system to suggest a node to the partition manager even if the operating system dispatches a task to a virtual processor that does not have a home node that corresponds to the home node of the task. This allows the partition manager to determine on-the-fly whether a physical processor in the home node becomes available, and to run the virtual processor that has a different home node on the suggested node, which preferably corresponds to the home node of the task. In this manner a partition manager has information from the operating system that allows the partition manager to override the home node of the virtual processor and assign the virtual processor to a different node instead, which is the home node of the task that was dispatched to the virtual processor.

Figure 12:
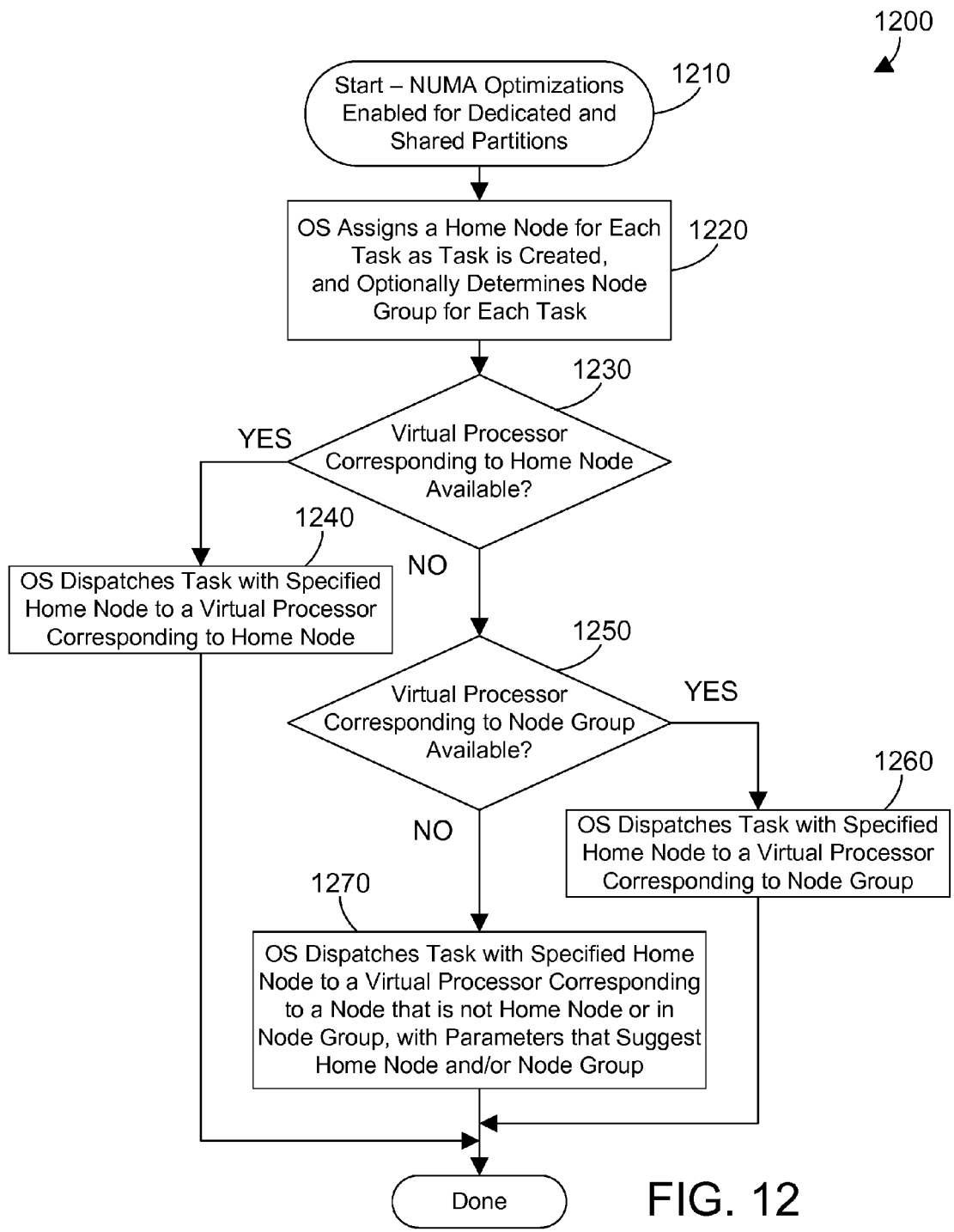
FIG. 12 is a flow diagram of a method for an operating system in a logical partition to dispatch tasks in a way that supports NUMA optimizations in both dedicated and shared logical partitions.

Referring to FIG. 12, a method 1200 begins when NUMA optimizations are enabled for both dedicated and shared logical partitions (step 1210). An operating system assigns a home node for each task as the task is created, and optionally determines a node group for each task (step 1220). The disclosure and claims recognize that a NUMA topology may include many different levels of memory hierarchy. This means nodes at a similar level of memory hierarchy may be grouped. If a physical processor on a home node is not available, but a physical processor on a different node on the same group is available, the partition manager may run the virtual processor on the different node, thereby increasing system performance when compared to running the virtual processor on a node outside the node group.

If a virtual processor is available that has a home node parameter 1110 that corresponds to the home node for the task assigned in step 1220 (step 1230=YES), the operating system dispatches the task with the specified home node to a virtual processor that corresponds to the specified home node (step 1240). If a virtual processor corresponding to the home node is not available (step 1230=NO), method 1200 next determines whether a virtual processor corresponding to the node group of the home node is available (step 1250). If so (step 1250=YES), the operating system dispatches the task with the specified home node to a virtual processor corresponding to the node group (step 1260). If no virtual processor corresponding to the node group is available (step 1250=NO), the operating system dispatches the task with the specified home node to a virtual processor corresponding to a node that is not the home node and is not in the node group, with a suggestion parameter (e.g., 1120 in FIG. 11) that suggests the home node or node group (step 1270).

Figure 13:
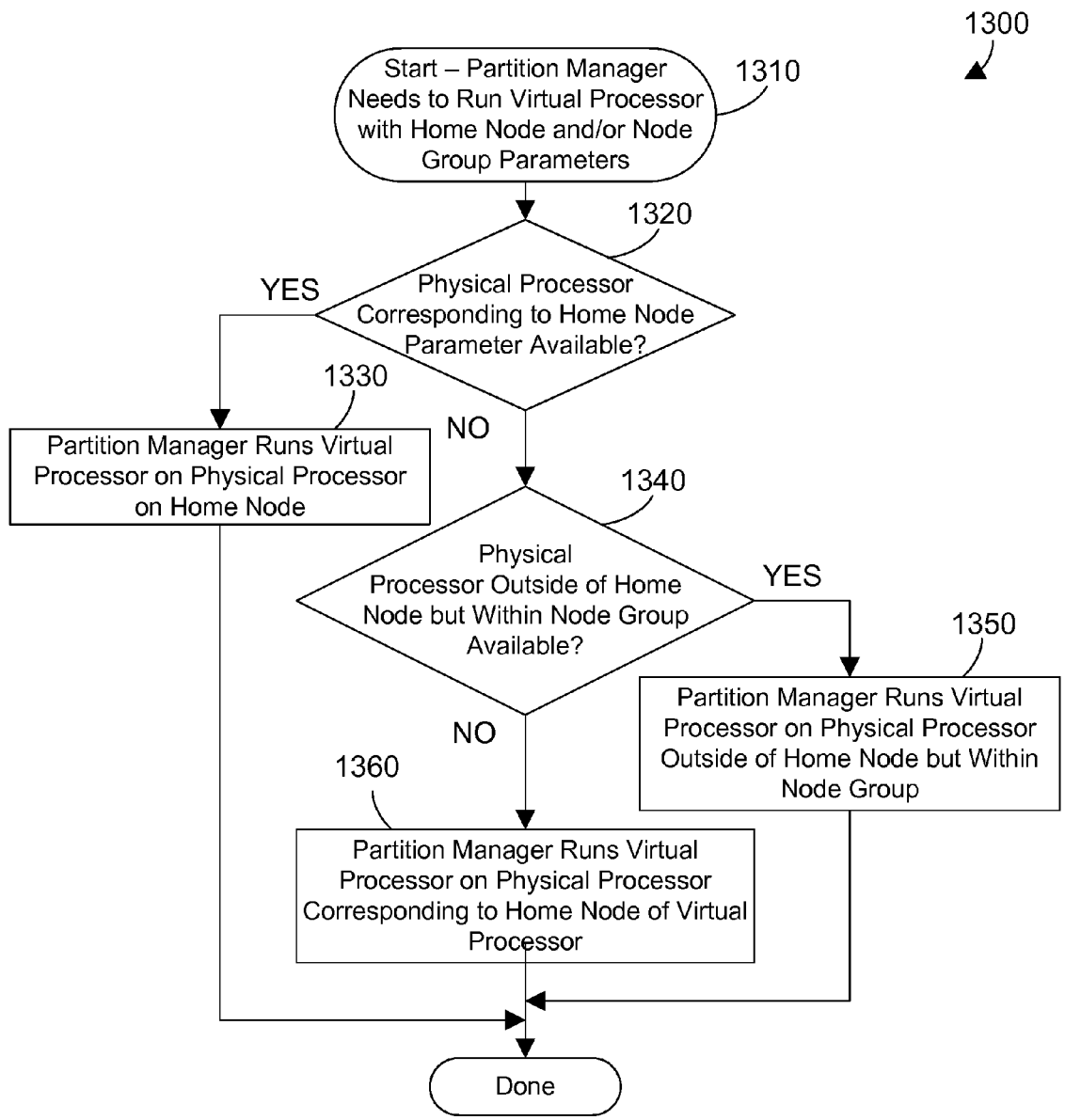
FIG. 13 is a flow diagram of a method for a partition manager to run a virtual processor in a way that supports NUMA optimizations in both dedicated and shared logical partitions.

While method 1200 in FIG. 12 shows steps in an operating system dispatching tasks to virtual processors, method 1300 in FIG. 13 shows steps for a partition manager to run a virtual processor on a physical processor. Method 1300 begins when the partition manager needs to run a virtual processor that includes home node or node group parameters (step 1310), such as home node parameter 1110 in FIG. 11. If there is a physical processor available that corresponds to the home node parameter specified in the virtual processor (step 1320=YES), the partition manager runs the virtual processor on a physical processor on the home node (step 1330). If there is no physical processor available that corresponds to the home node parameter (step 1320=NO), but a physical processor outside of the home node but within the node group is available (step 1340=YES), the partition manager runs the virtual processor on a physical processor outside of the home node within the node group (step 1350). If there is no physical processor outside of the home node but within the node group that is available (step 1340=NO), the partition manager runs the virtual processor on a physical processor corresponding to the home node parameter in the virtual processor (step 1360), which is a physical processor on a node different than the home node parameter for the task.

Figure 14:
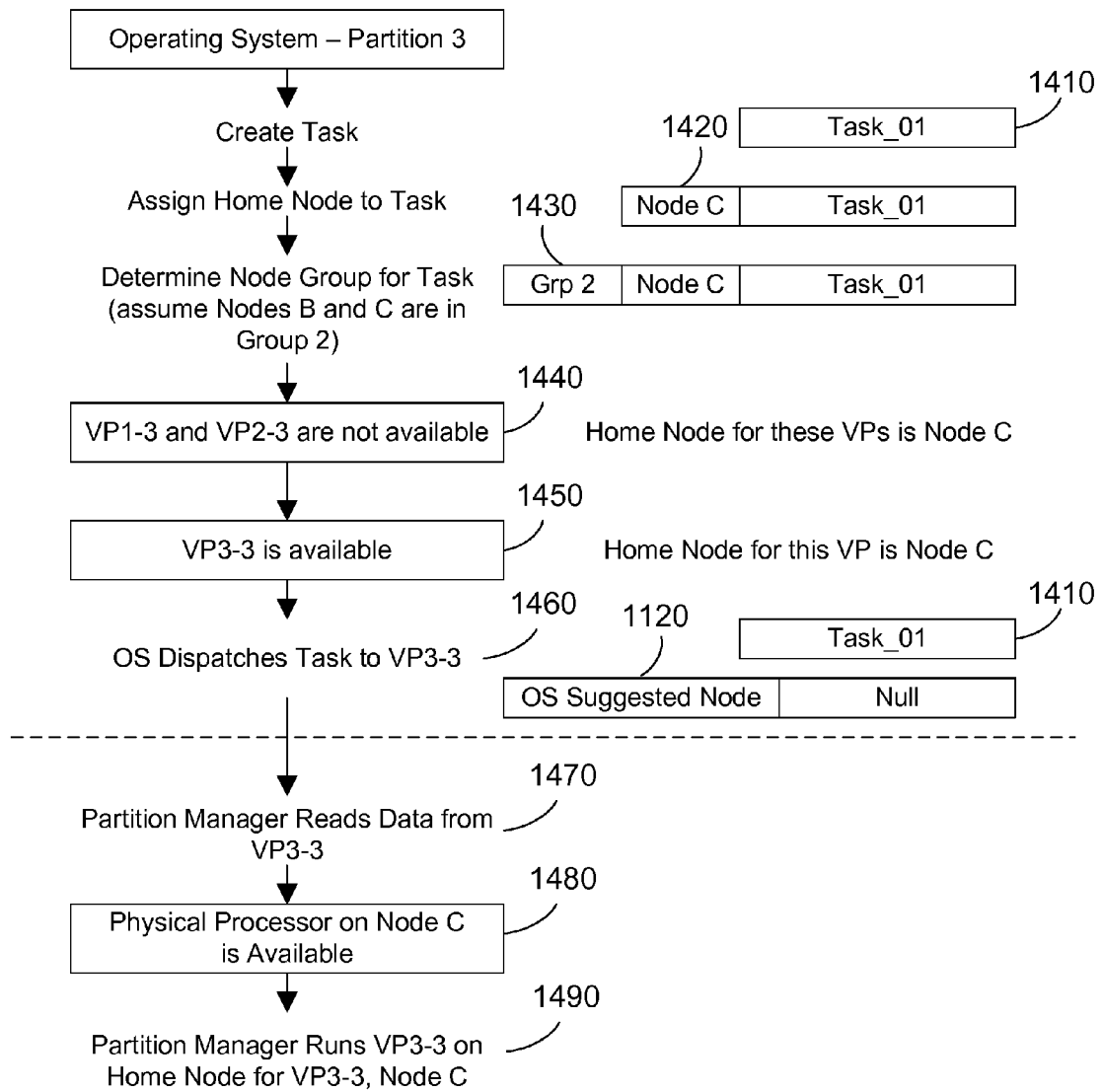
FIG. 14 is a diagram showing a first specific example that illustrates steps in an operating system in a shared logical partition dispatching a task to a virtual processor, followed by the partition manager assigning the virtual processor to a processor on a node.

Some simple examples are now presented to illustrate how NUMA optimizations are enabled in shared logical partitions. Referring to FIG. 14, we assume for this example the operating system in partition 3, namely operating system 340C in FIG. 3, begins by creating a task, shown at 1410 in FIG. 14. The operating system assigns a home node to the task, as shown at 1420. The operating system may optionally determine a node group for the task. We assume for this example nodes B and C in FIG. 3 are in Group 2, so we indicate at 1430 that node C is in group 2. We next assume VP1-3 and VP2-3 are not available at 1440, but VP3-3 is available at 1450. The home node for VP3-3 is Node C 100C shown in FIG. 3. The operating system then dispatches the task to VP3-3 at 1460. Note the OS suggested node parameter 1120 shown in FIG. 11 is preferably set to NULL, meaning the operating system does not make any suggestion for a node other than the home node that corresponds to the virtual processor. At this point the virtual processor needs to be run by the partition manager. The partition manager reads the home node parameter 1110 from VP3-3 at 1470 and determines Node C is the home node, then determines a physical processor on Node C 100C is available at 1480. The partition manager then runs the virtual processor on a physical processor in the home node, Node C 100C, at 1490. This example illustrates that when a virtual processor corresponding to the home node of the task is available, and a physical processor corresponding to the home node is also available, the virtual processor is run on a physical processor in the specified home node.

Figure 15:
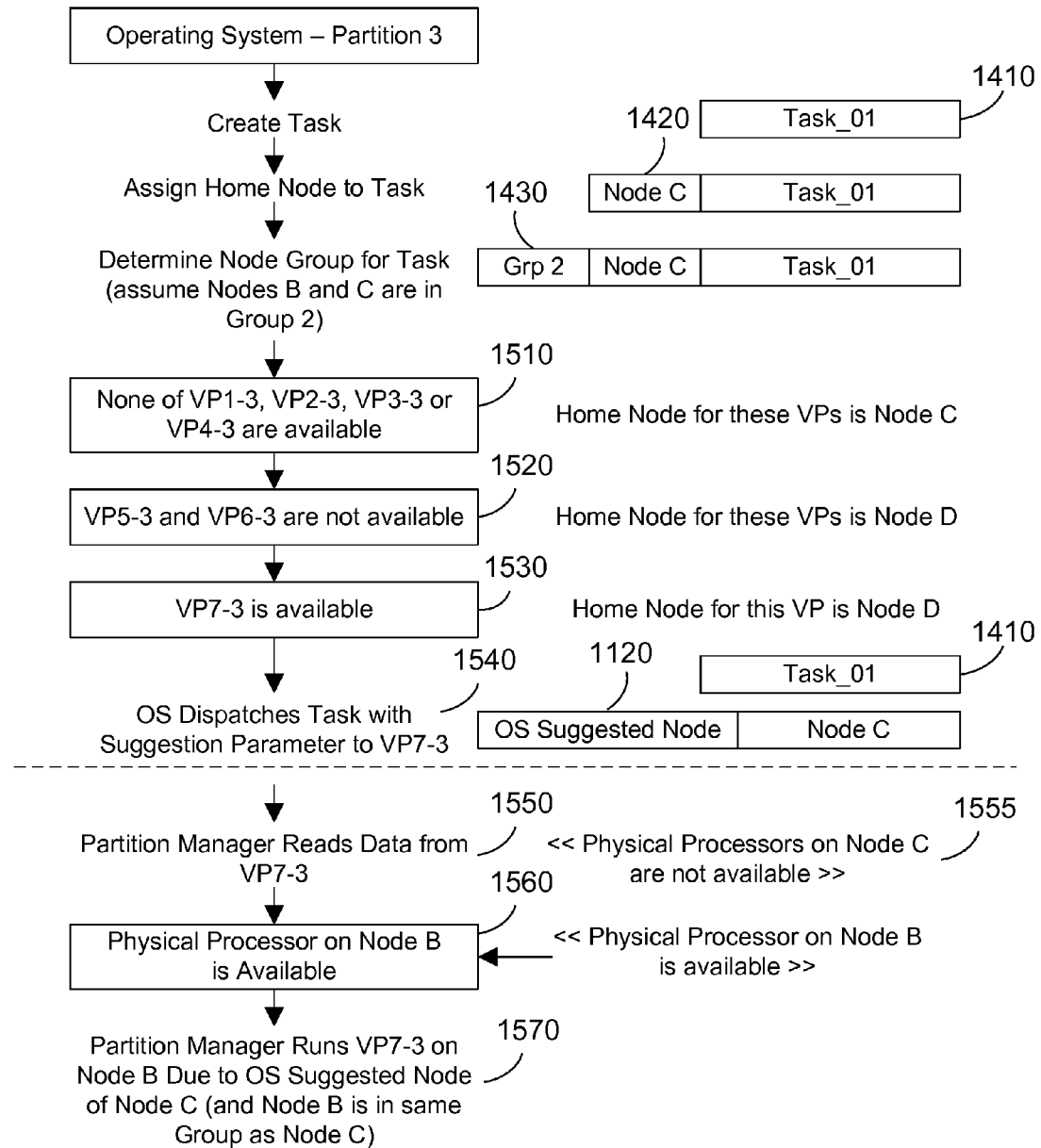
FIG. 15 is a diagram showing a second specific example that illustrates steps in an operating system in a shared logical partition dispatching a task to a virtual processor, followed by the partition manager assigning the virtual processor to a processor on a node.

Referring to FIG. 15, we assume the same steps are performed by the operating system as shown in FIG. 14, resulting in a task 1410 with a home node 1420 of Node C and a group 1430 of Group 2. We assume for this example none of the virtual processors that have a home node of Node C are available at 1510. We further assume that two of the virtual processors that have a home node of node D are not available at 1520, but we assume VP7-3 that has a home node of Node D is available at 1530. The operating system dispatches the task with the OS Suggested Node 1120 of Node C to VP7-3. Note the home node of VP7-3 is Node D, but the operating system suggested node 1120 is Node C. This suggestion is provided to allow the partition manager to run the virtual processor on Node C if there is a physical processor on Node C available. The partition manager reads data from VP7-3 at 1550, and determines its home node is Node D. We assume the physical processors on Node C are not available at 1555, but a physical processor on Node B is available at 1560. The partition manager runs the virtual processor on Node B at 1570 due to the OS Suggested Node of Node C, and because Node B is in the same group as Node C. Thus, even though the task cannot be dispatched to a virtual processor that corresponds to the home node of the task, the virtual processor may be run on a node in the same group, thereby improving system performance.

Referring to FIG. 16, this example assumes all the same steps are taken by the operating system above the dotted line, as discussed in detail above. In response, the partition manager reads data from VP7-3 at 1610, and determines the home node of VP7-3 is Node D while the OS suggested node 1120 is Node C. We assume for this example a physical processor on Node C becomes available at 1620, before the partition manager runs the virtual processor VP7-3. Because a physical processor on Node C is available at 1630, the partition manager runs the virtual partition on Node C due to the OS suggested node parameter 1120 at 1640. This example shows how the partition manager can use the OS suggested node parameter 1120 to run a virtual processor on a node that is different than the home node for the virtual processor, but on a node that matches the home node parameter 1420 of the task. The partition manager may thus override the home node specified in the virtual processor, and choose instead to execute the task on the node specified in the OS suggested node parameter 1120.

Referring to FIG. 17, this example again assumes the operating system performs all the same steps shown in FIGS. 15 and 16 above the dotted line, as discussed in detail above. In response, the partition manager reads data from VP7-3 at 1710, and determines the home node of VP7-3 is Node D while the OS suggested node 1120 is Node C. We assume the physical processors on Node C are unavailable at 1720, the physical processors on Node B are unavailable at 1730, but a physical processor for Node D is available at 1740, as also shown at 1750. As a result, the partition manager runs the virtual processor on Node D because there are no processors available on Node C (which corresponds to the OS Suggested Node) and there are no processor available on Node B (which is in the same node group, Group 2, as Node C). The partition manager thus runs the virtual processor on a physical processor on Node D, which is the home node for VP7-3.

The disclosure and claims herein enable NUMA optimizations on shared logical partitions. Each virtual processor has a home node parameter and an operating system suggested node parameter. When an operating system creates a task, it assigns a home node parameter for the task. The operating system then dispatches the task to a virtual processor, giving preference first to a virtual processor corresponding to the home node specified in the task, giving second preference to a virtual processor that is in the same node group as the home node specified in the task, and if neither of these preferences may be met, dispatching the task to a virtual processor that has a home node parameter different than the home node of the task. When the partition manager is called to run the virtual processor, the partition manager first determines whether the OS suggested node parameter in the virtual processor specifies a node other than the home node of the virtual processor. If so, the partition manager first attempts to run the virtual processor on a physical processor on the node specified in the OS suggested node parameter. If no physical processors on the node specified in the OS suggested node are available, the partition manager determines whether there is a node in the same node group as the OS suggested node, and if so, the task is dispatched to a processor on a different node but in the same node group. If there is no physical processor available in either the node specified in the OS suggested node parameter or in its node group, the partition manager runs the virtual processor on a physical processor in the node corresponding to the home node parameter of the virtual processor. In this manner NUMA optimizations may be enabled in shared logical partitions, thereby increasing the performance of this type of logically-partitioned computer system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer system comprising:
    a plurality of nodes that each has at least one physical processor coupled to a local memory in a non-uniform memory access (NUMA) topology;
    a plurality of logical partitions defined on the plurality of nodes, the plurality of logical partitions including a plurality of shared logical partitions that share a pool of common nodes;
    an operating system in each of the plurality of shared logical partitions that assigns a home node to a task when the task is created, assigns the task to a first virtual processor corresponding to the home node when the first virtual processor is available, and assigns the task to a second virtual processor corresponding to a node other than the home node with a suggestion parameter that specifies the home node when the first virtual processor is not available; and
    a partition manager that runs each virtual processor on one of the physical processors, the partition manager running the first virtual processor on a physical processor corresponding to the home node when the home node has an available physical processor, the partition manager running the first virtual processor on a physical processor corresponding to a node different than the home node when the home node has no available physical processor.

2. The computer system of claim 1 wherein the partition manager reads the suggestion parameter in the second virtual processor, and when the home node has an available physical processor, the partition manager runs the second virtual processor on a physical processor corresponding to the suggestion parameter.

3. The computer system of claim 2 wherein, when the home node does not have an available physical processor, the partition manager runs the second virtual processor on a physical processor corresponding to the node other than the home node.

4. The computer system of claim 1 wherein each of the plurality of nodes is in a node group, and wherein the partition manager runs the first virtual processor on a physical processor corresponding to a node different than the home node and in a same node group as the home node when the home node has no available physical processor.

5. The computer system of claim 1 wherein each virtual processor specifies one of the plurality of nodes as a home node.

6. The computer system of claim 5 wherein each virtual processor comprises a suggestion parameter that specifies a suggested node, wherein the suggestion parameter is written by an operating system that dispatches tasks to the virtual processor.

7. An article of manufacture comprising:
(A) an operating system for each of a plurality of shared logical partitions that share a pool of common nodes, each node having multiple physical processors coupled to a local memory in a non-uniform memory access (NUMA) topology, the operating system assigning a home node to a task when the task is created, assigning the task to a first virtual processor corresponding to the home node when the first virtual processor is available, and assigning the task to a second virtual processor corresponding to a node other than the home node with a suggestion parameter that specifies the home node when the first virtual processor is not available;
(B) a partition manager that runs each virtual processor on one of the physical processors, the partition manager running the first virtual processor on a physical processor corresponding to the home node when the home node has an available physical processor, the partition manager running the first virtual processor on a physical processor corresponding to a node different than the home node when the home node has no available physical processor; and
(C) non-transitory recordable media bearing (A) and (B).

8. The article of manufacture of claim 7 wherein the partition manager reads the suggestion parameter in the second virtual processor, and when the home node has an available physical processor, the partition manager runs the second virtual processor on a physical processor corresponding to the suggestion parameter.

9. The article of manufacture of claim 8 wherein, when the home node does not have an available physical processor, the partition manager runs the second virtual processor on a physical processor corresponding to the node other than the home node.

10. The article of manufacture of claim 7 wherein each of the plurality of nodes is assigned to a node group, and wherein the partition manager runs the first virtual processor on a physical processor corresponding to a node different than the home node and in a same node group as the home node when the home node has no available physical processor.

11. The article of manufacture of claim 7 wherein each virtual processor specifies one of the plurality of nodes as a home node.

12. The article of manufacture of claim 11 wherein each virtual processor comprises a suggestion parameter that specifies a suggested node, wherein the suggestion parameter is written by an operating system that dispatches tasks to the virtual processor.

* * * * *